US007161258B2

(12) United States Patent
Kanai

(10) Patent No.: US 7,161,258 B2
(45) Date of Patent: Jan. 9, 2007

(54) CONTROL APPARATUS FOR INTERNAL COMBUSTION ENGINE

(75) Inventor: Hiroshi Kanai, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 159 days.

(21) Appl. No.: 11/067,651

(22) Filed: Feb. 28, 2005

(65) Prior Publication Data

US 2005/0194788 A1 Sep. 8, 2005

(30) Foreign Application Priority Data

Mar. 5, 2004 (JP) ............................ 2004-062724

(51) Int. Cl.

*F02N 11/06* (2006.01)
*H02P 9/04* (2006.01)
*F02M 33/02* (2006.01)
*B60T 7/12* (2006.01)
*G05D 1/00* (2006.01)

(52) U.S. Cl. .................... 290/40 R; 123/519; 123/520; 123/521; 701/103

(58) Field of Classification Search ................ 123/478, 123/480, 516, 519–521; 290/40 R; 701/103–105
See application file for complete search history.

(56) References Cited

U.S. PATENT DOCUMENTS 4,993,386 A * 2/1991 Ozasa et al. ............... 123/25 J
5,143,040 A * 9/1992 Okawa et al. .............. 123/684
5,150,686 A * 9/1992 Okawa et al. .............. 123/698
5,203,870 A * 4/1993 Kayanuma et al. ...... 123/198 D
5,216,995 A * 6/1993 Hosoda et al. .............. 123/520
5,216,997 A * 6/1993 Osanai et al. ............... 123/698
5,216,998 A * 6/1993 Hosoda et al. .............. 123/698
5,245,975 A * 9/1993 Ito ............................. 123/520
5,315,980 A * 5/1994 Otsuka et al. .............. 123/520
5,368,002 A * 11/1994 Hoshino et al. ............ 123/520
5,438,967 A * 8/1995 Ito ........................ 123/339.12
5,598,828 A * 2/1997 Osanai ....................... 123/675
5,606,955 A * 3/1997 Yuda .......................... 123/520
5,613,481 A * 3/1997 Kitagawa et al. ........... 123/698
5,632,261 A * 5/1997 Maki et al. ................. 123/674
5,647,332 A * 7/1997 Hyodo et al. ............... 123/519
5,655,507 A * 8/1997 Kawasaki ................... 123/674
5,669,360 A * 9/1997 Hyodo et al. ............... 123/520
5,685,285 A * 11/1997 Ohtani et al. ............... 123/698
5,694,904 A * 12/1997 Osanai ....................... 123/520
5,699,778 A * 12/1997 Muraguchi et al. ......... 123/698
5,754,971 A * 5/1998 Matsumoto et al. ........ 701/103
5,765,372 A * 6/1998 Mitobe et al. ................ 60/301
5,778,867 A * 7/1998 Osanai ....................... 123/698
5,782,218 A * 7/1998 Akinori .................. 123/198 D
5,850,820 A * 12/1998 Tsutsumi et al. ........... 123/520

(Continued)

FOREIGN PATENT DOCUMENTS

JP A 5-321739 12/1993

(Continued)

*Primary Examiner*—Darren Schuberg
*Assistant Examiner*—Pedro J. Cuevas
(74) *Attorney, Agent, or Firm*—Oliff & Berridge, PLC

(57) ABSTRACT

In a control apparatus for an internal combustion engine, an amount of electricity to be generated by an alternator (a target charging voltage) is set based on a vapor concentration of vaporized fuel when a purge execution condition is met for purging the vaporized fuel collected by a canister, whereby a fluctuation in rotation in an idling operation state is suppressed, an appropriate purging treatment of the vaporized fuel is allowed, and the drivability is improved.

3 Claims, 4 Drawing Sheets

U.S. PATENT DOCUMENTS

| | | | | |
|---|---|---|---|---|
| 5,862,795 | A * | 1/1999 | Osanai | 123/520 |
| 5,909,727 | A * | 6/1999 | Nakagawa | 123/520 |
| 5,944,003 | A * | 8/1999 | Osanai | 123/698 |
| 5,988,150 | A * | 11/1999 | Osanai | 123/698 |
| 6,044,831 | A * | 4/2000 | Takagi et al. | 123/698 |
| 6,079,397 | A * | 6/2000 | Matsumoto et al. | 123/698 |
| 6,095,121 | A * | 8/2000 | Osanai | 123/520 |
| 6,102,003 | A * | 8/2000 | Hyodo et al. | 123/436 |
| 6,116,221 | A * | 9/2000 | Matsumoto et al. | 123/520 |
| 6,182,641 | B1 * | 2/2001 | Yamada et al. | 123/519 |
| 6,196,203 | B1 * | 3/2001 | Grieve et al. | 123/520 |
| 6,234,156 | B1 * | 5/2001 | Muto | 123/698 |
| 6,257,218 | B1 * | 7/2001 | Takagi et al. | 123/698 |
| 6,283,088 | B1 * | 9/2001 | Takagi et al. | 123/295 |
| 6,286,316 | B1 * | 9/2001 | Waldrop et al. | 60/660 |
| 6,305,362 | B1 * | 10/2001 | Kitamura et al. | 123/520 |
| 6,308,692 | B1 * | 10/2001 | Ishikawa et al. | 123/519 |
| 6,325,052 | B1 * | 12/2001 | Mashiki | 123/520 |
| 6,330,879 | B1 * | 12/2001 | Kitamura et al. | 123/520 |
| 6,332,456 | B1 * | 12/2001 | Mashiki | 123/520 |
| 6,347,617 | B1 * | 2/2002 | Kitamura et al. | 123/520 |
| 6,394,074 | B1 * | 5/2002 | Okada et al. | 123/519 |
| 6,529,815 | B1 * | 3/2003 | Hawkins et al. | 701/104 |
| 6,729,312 | B1 * | 5/2004 | Furushou | 123/520 |
| 6,786,207 | B1 * | 9/2004 | Kojima et al. | 123/516 |
| 6,880,534 | B1 * | 4/2005 | Yoshiki et al. | 123/520 |
| 6,948,475 | B1 * | 9/2005 | Wong et al. | 123/299 |
| 6,971,375 | B1 * | 12/2005 | Amano et al. | 123/520 |
| 7,007,684 | B1 * | 3/2006 | Itakura et al. | 123/698 |
| 7,017,558 | B1 * | 3/2006 | Osanai | 123/520 |
| 7,069,916 | B1 * | 7/2006 | Osanai | 123/516 |
| 2002/0046739 | A1 * | 4/2002 | Okada et al. | 123/518 |
| 2002/0069011 | A1 * | 6/2002 | Hawkins et al. | 701/104 |
| 2003/0154963 | A1 * | 8/2003 | Furushou | 123/520 |
| 2004/0261765 | A1 * | 12/2004 | Osanai | 123/325 |
| 2005/0056262 | A1 * | 3/2005 | Osanai | 123/520 |
| 2005/0211228 | A1 * | 9/2005 | Amano et al. | 123/520 |
| 2005/0240336 | A1 * | 10/2005 | Reddy | 701/103 |
| 2006/0042605 | A1 * | 3/2006 | Amano et al. | 123/520 |

FOREIGN PATENT DOCUMENTS

| | | |
|---|---|---|
| JP | A 6-159126 | 6/1994 |
| JP | A 2002-13446 | 1/2002 |

* cited by examiner

CONTROL APPARATUS FOR INTERNAL COMBUSTION ENGINE

BACKGROUND OF THE INVENTION

1. Field of the Invention

The present invention relates to a control apparatus for an internal combustion engine which controls an amount of power generated by an electric generator mounted in the internal combustion engine, and in particular to such a control apparatus which allows a secure purging of vaporized gas from a fuel tank together with a suppression of fluctuation in rotation of the internal combustion engine.

2. Description of the Related Art

An internal combustion engine incorporates a vaporized fuel treatment unit which serves to treat the vaporized fuel generated in a fuel tank without emitting the vaporized fuel into the atmosphere. The vaporized fuel treatment unit includes a canister to collect the vaporized fuel from the fuel tank. The vaporized fuel is temporarily absorbed by an absorbent in the canister, and during the operation of the internal combustion engine, the vaporized fuel treatment unit purges a fuel ingredient, hydrocarbon (HC) for example, in the vaporized fuel collected in the canister through a purge path to an intake path for treatment, utilizing a negative pressure produced in the intake path.

A control apparatus for the internal combustion engine decreases an amount of fuel injection in accordance with a vapor concentration of the vaporized fuel from the fuel tank when the vapor concentration is high. In an idling operation state of the internal combustion engine, however, such a control makes an actual amount of fuel injection excessively low since the amount of fuel injection is low in the idling operation state because of a low pressure even without the controlled decrease of fuel injection in accordance with the amount to be treated. When the amount of fuel injection is excessively low, stability of combustion is negatively affected to lower efficiency of emission purification or to functionally disable an injection by a fuel injector. Hence, a minimum amount of fuel injection (minimum injection time period) is generally set, and the control apparatus controls the actual injection amount to be the set minimum amount and decreases the treated amount of vaporized fuel when the amount of fuel injection drops below the minimum amount of fuel injection.

When features such as reduction in friction loss, enhancement of combustion in the idling operation state, and reduction of the number of rotations in idling, are to be realized for the reduction of fuel consumption of the internal combustion engine, an amount of required air in the idling operation state decreases thereby lowering a reference fuel injection amount, and the reference fuel injection amount approaches the above described minimum fuel injection amount to lessen the margin. Thus in the idling operation state, because of the small margin of the fuel injection amount, the vaporized fuel treatment unit cannot properly perform the purging treatment of a predetermined amount of vaporized fuel collected in the canister.

A technique is proposed to solve such a problem in Japanese Patent Laid-Open No. 2002-013446, for example. According to the disclosed technique, when the amount of vaporized fuel from the fuel tank is high in the idling operation state, the number of rotations is set to a higher value than usual in order to increase the amount of air intake and therefore the amount to be purged.

The internal combustion engine incorporates an alternator as an electric generator for operations such as a battery charging and a power supply to various electric parts. The alternator is drivably connected to a crank shaft of the internal combustion engine via a belt or the like and is driven to rotate and generates power by the operation of the internal combustion engine. The amount of power generated by the alternator is controlled by the control apparatus so that the charging voltage varies according to the operation states of the internal combustion engine, i.e., normal vehicle running, acceleration running, and deceleration running, the state of use of various electric parts, or the like.

Since various parameters are likely to fluctuate in the idling operation state of the internal combustion engine, a fluctuation in the rotation occurs, though minute. In addition, since the amount of power generation (charging voltage) of the alternator is changed according to the operation state of the internal combustion engine, the amount of power generation also fluctuates in a low rotation range, e.g. in the idling. The fluctuations in rotation and the amount of power generation function as power generation friction of the alternator, and a generated torque in the internal combustion engine is an approximate value of the sum of the friction of the internal combustion engine and the power generation friction of the alternator. Hence, when the power generation friction of the alternator varies, the generated torque in the internal combustion engine, therefore, the amount of air intake and the amount of fuel injection fluctuate to cause the fluctuation in rotation of the internal combustion engine, thereby deteriorating the drivability.

When the amount of air intake and the amount of fuel injection vary in the idling operation state of the internal combustion engine, the vaporized fuel treatment unit cannot properly purge the vaporized fuel collected in the canister to the intake path thereby preventing the secure treatment of the vaporized fuel.

SUMMARY OF THE INVENTION

To solve the problems as described above, an object of the present invention is to provide a control apparatus for an internal combustion engine to enhance the drivability through a proper purging treatment of vaporized fuel and to suppress the fluctuation in rotation in the idling operation state.

To solve the problems as described above and to achieve the object, a control apparatus for an internal combustion engine according to the present invention includes: an electric generator which is driven by the internal combustion engine; a battery which charges electricity generated by the electric generator; a canister which absorbs vaporized fuel from a fuel tank; a vapor concentration detecting unit which detects a vapor concentration of the vaporized fuel; and a vaporized fuel purging unit that purges the vaporized fuel absorbed by the canister into an intake path of the internal combustion engine when a predetermined purge execution condition is met; and an amount of electricity generated by the electric generator is controlled to become higher when the vapor concentration detected by the vapor concentration detecting unit is high compared with when the vapor concentration is low when the internal combustion engine is in an idling operation state and the purge execution condition is met.

According to the control apparatus for the internal combustion engine of the present invention, since the amount of power generated by the electric generator is controlled to be higher when the vapor concentration of the vaporized fuel is high compared with when the vapor concentration is low if the purge execution condition is met in the idling operation state of the internal combustion engine, the power generation friction of the electric generator becomes constant and the fluctuation in rotation of the internal combustion engine can be suppressed and the proper purging treatment of the vaporized fuel can be achieved whereby the drivability can be enhanced.

Further, in the control apparatus for the internal combustion engine according to the present invention, the amount of electricity generated by the electric generator is controlled so that the amount of electricity generated by the electric generator increases along with an increase in the vapor concentration detected by the vapor concentration detecting unit.

Still further, the control apparatus for the internal combustion engine according to the present invention includes a charge state detecting unit that detects a charge state of the battery, and the amount of electricity generated by the electric generator is controlled so that the amount of electricity generated by the electric generator is increased when a charge amount of the battery detected by the charge state detecting unit is low compared with when the charge amount is high.

DETAILED DESCRIPTION OF THE PREFERRED EMBODIMENTS

In the following, an embodiment of a control apparatus for an internal combustion engine according to the present invention will be described in detail with reference to the drawings. Note that the present invention is not limited to the embodiment.

Figure 1:
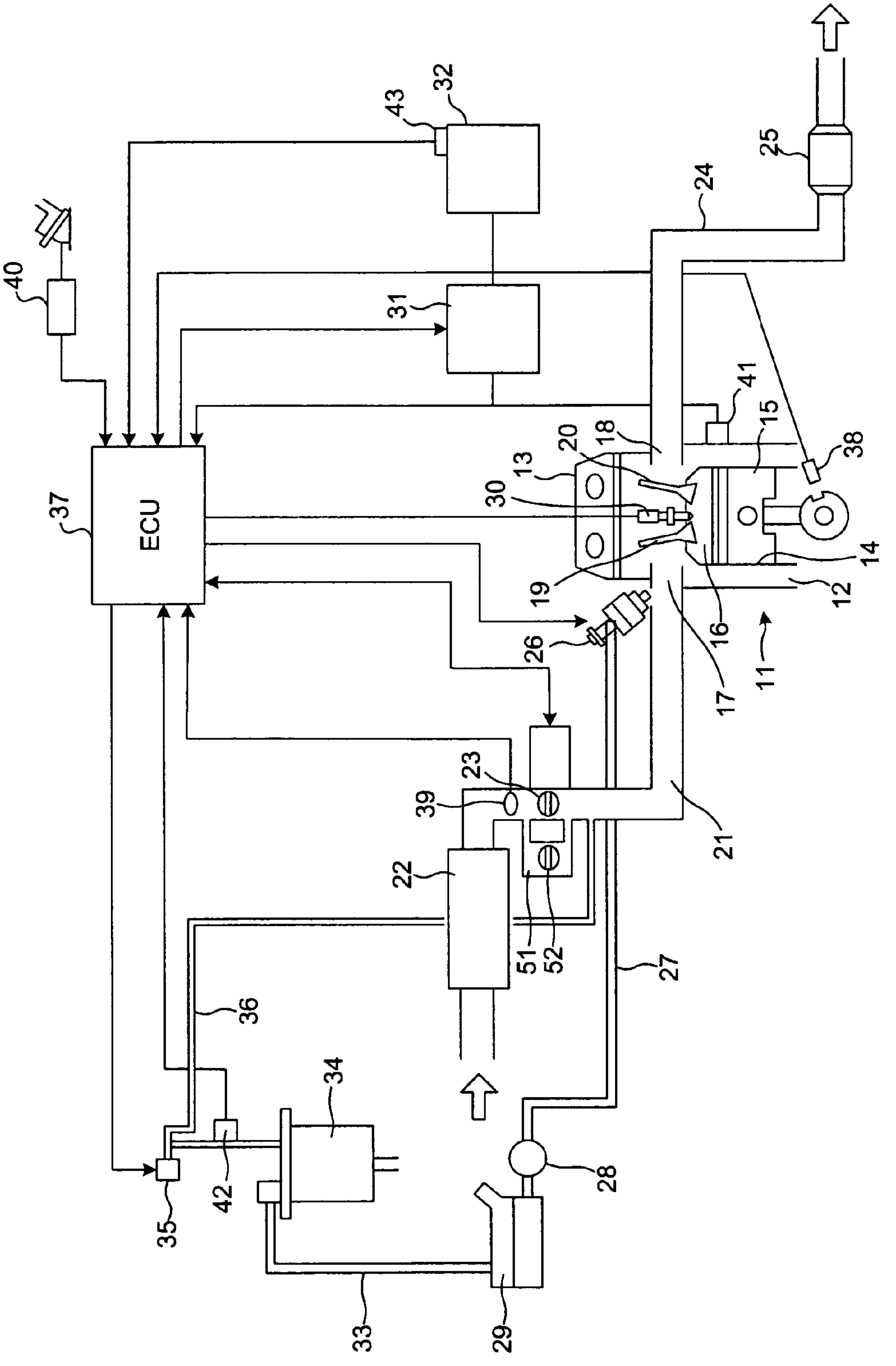
FIG. 1 is a schematic diagram of a control apparatus for an internal combustion engine according to an embodiment of the present invention.
Figure 2:
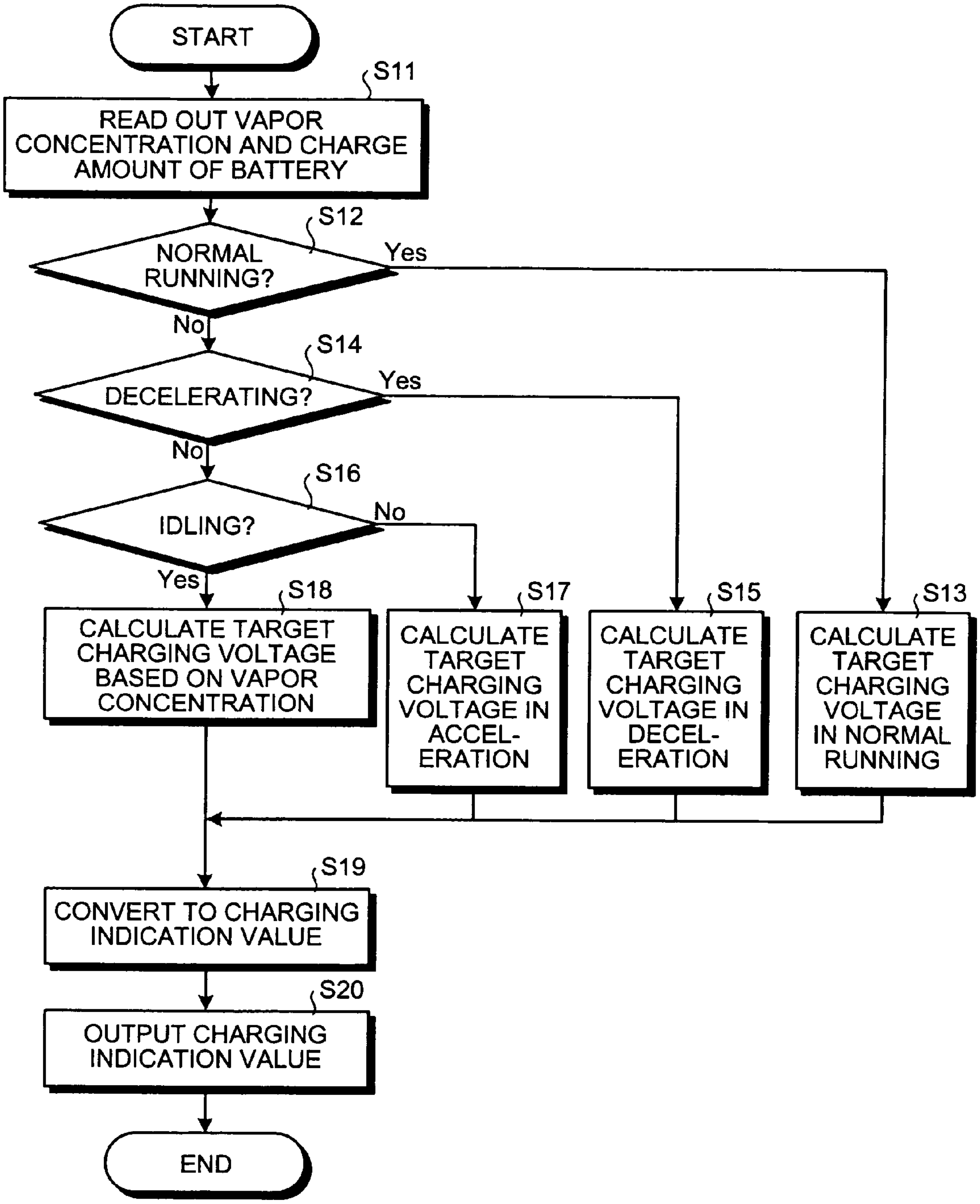
FIG. 2 is a flowchart of a charging control by the control apparatus for the internal combustion engine of the embodiment.
Figure 3:
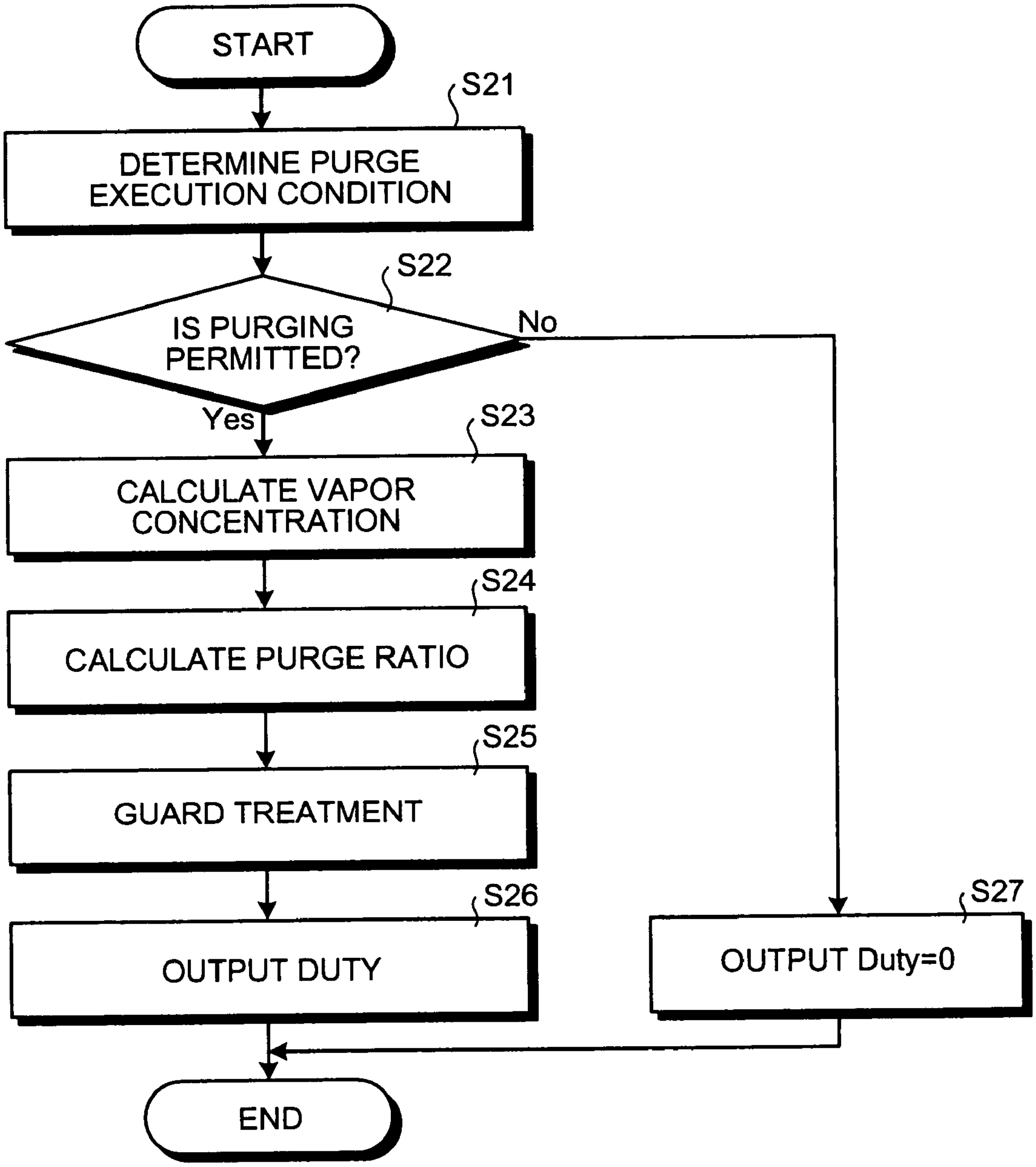
FIG. 3 is a flowchart of a purging control by the control apparatus for the internal combustion engine of the embodiment.
Figure 4:
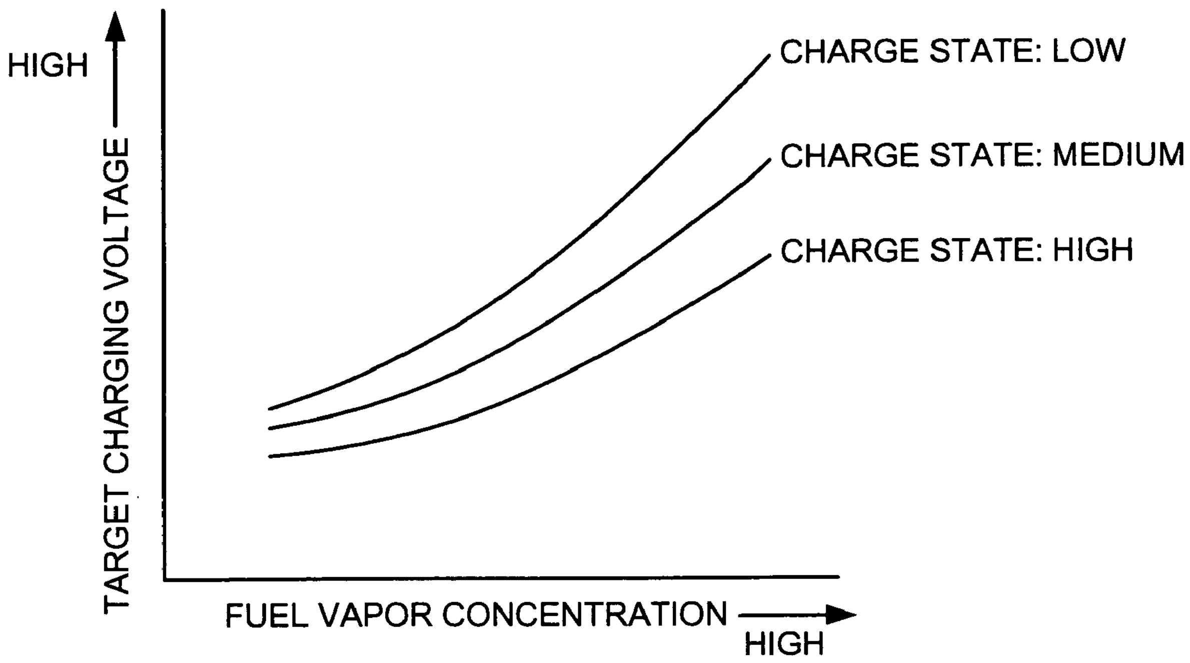
FIG. 4 is a graph showing a relation between fuel vapor concentrations and target charging voltages in the control apparatus for the internal combustion engine of the embodiment.

FIG. 1 is a schematic diagram of a control apparatus for an internal combustion engine according to the embodiment of the present invention, FIG. 2 is a flowchart of a charging control by the control apparatus for the internal combustion engine of the embodiment, FIG. 3 is a flowchart of a purging control by the control apparatus for the internal combustion engine of the embodiment, and FIG. 4 is a graph showing a relation between fuel vapor concentrations and target charging voltages in the control apparatus for the internal combustion engine of the embodiment.

In the control apparatus for the internal combustion engine of the embodiment, as shown in FIG. 1, an engine 11 is a gasoline engine of a spark ignition type. In the engine 11, a cylinder head 13 is fastened to a cylinder block 12, on which formed a cylinder bore 14 to which a piston 15 is fitted in a vertically movable manner. Below the cylinder block 12, a crank shaft is rotatably supported and each piston 15 is connected to the crank shaft via a connecting rod.

A combustion chamber 16 is formed with the cylinder block 12, the cylinder head 13, and the piston 15, and an intake port 17 and an exhaust port 18 communicate with respective sides of the combustion chamber 16, and face with lower ends of an intake valve 19 and an exhaust valve 20, respectively. The vertical movement of the intake valve 19 and the exhaust valve 20 at a predetermined timing allows opening and closing between the intake port 17 and the combustion chamber 16, and between the combustion chamber 16 and the exhaust port 20. An intake tube 21 is connected to the intake port 17, an air cleaner 22 is attached to an inlet portion of the intake tube 21, and an electronic throttle valve 23 is attached to a downstream side thereof. Further, a bypass path 51 is provided to the intake tube 21 to bypass the electronic throttle valve 23, and an idle speed control valve (ISC valve) 52 is provided to the bypass path 51 to control an air intake amount at a time the electronic throttle valve 23 is completely closed in order to control the number of rotations of the engine 11 in the idling state. On the other hand, an exhaust tube 24 is connected to the exhaust port 20 and a catalyst device 25 is attached to a downstream portion of the exhaust tube 24.

An injector 26 is attached to the exhaust tube 21 to inject gasoline as a fuel to the intake port 17, and a fuel injection pump 28 and a fuel tank 29 are connected via a fuel supply tube 27 to the injector 26. An ignition plug 30 is attached to the cylinder head 13 above the combustion chamber 16.

Further, an alternator 31 as an electric motor is attached to the engine 11, and a battery 32 is electrically connected to the alternator 31 which power generating function is controlled in accordance with the operation state of the engine and the charge state of the battery 32. The crank shaft of the engine 11 and a rotation shaft of the alternator 31 are drivably connected via a pulley and a belt. With the driving of the engine 11, the alternator 31 starts operating to begin power generation and the generated power is consumed by various electric parts or used to charge the battery 32.

A canister 34 is connected to the fuel tank 29 via a vapor path 33, and the canister 34 is connected to a downstream side of the electronic throttle valve 23 in the intake tube 21 via a purge path 36 having a purge control valve 35. The canister 34 temporarily stores the vaporized fuel (harmful substance such as HC) generated in the fuel tank 29 and performs the purging treatment by taking the vaporized fuel through the intake tube 21 utilizing the negative pressure created by the intake when the engine 11 is operating and the catalyst device 25 is normally performs purification.

A vehicle is provided with an electronic control unit (ECU) 37 to control apparatuses such as the engine 11 and the ECU 37 performs an overall control of the engine 11. The engine 11 is provided with a crank position sensor 38 which outputs a predetermined signal when each cylinder is at a predetermined crank position, and the ECU 37 receiving the signal from the crank position sensor 38 can calculate the number of rotations Ne of the engine. A throttle position sensor is incorporated in the electronic throttle valve 23 to detect a throttle opening $\theta_s$ and a completely closed state (idling state), and an air flow meter 39 is attached to an upstream side of the electronic throttle valve 23 to detect an amount of air intake $Q_A$. Further, a gas pedal position sensor 40 is attached to a gas pedal to detect an accelerator opening $\theta_A$ and a water temperature sensor 41 is attached to the engine 11 to detect an engine cooling water temperature K. The number of rotations of engine Ne, the throttle opening $\theta_S$, the intake air amount $Q_A$, the accelerator opening $\theta_A$, the engine cooling water temperature K are supplied to the ECU 37.

The ECU 37 determines a fuel injection amount, an injection period, an ignition period, or the like based on the operation state of the engine 11 indicated by detected parameters such as the number of rotations of engine Ne, the intake air amount $Q_A$, the throttle opening $\theta_s$, the idling signal, the accelerator opening $\theta_A$, the engine cooling water temperature K, or the like and thus the ECU 37 can control parts such as the injector 26 and the ignition plug 30. Specifically, the fuel injection amount is set based on the number of rotations Ne and the intake air amount $Q_A$, and corrected based on the changes in the operation states such as the throttle opening $\theta_s$, the accelerator opening $\theta_A$, the engine cooling water temperature K, or the like.

Further in the embodiment, the canister 34 absorbs the vaporized fuel generated in the fuel tank 29. When a predetermined purge execution condition is met during the operation of the engine 11, the ECU 37 controls the purge control valve 35 according to the duty ratio and purges the vaporized fuel via the purge path 36 to the intake tube 21. Here, a vapor concentration sensor (vapor concentration detector) 42 to detect the vapor concentration of the vaporized fuel is attached to the purge path 36, and the ECU 37 corrects the fuel injection amount so that the fuel injection amount decreases according to the vapor concentration of the vaporized fuel detected by the vapor concentration sensor 42. In many engines, the vapor concentration is made calculable based on a detection signal from an oxygen concentration sensor arranged in the exhaust tube 24, even when the vapor concentration sensor 42 is not provided.

Further, the power generation amount of the alternator 31 is controllable and the ECU 37 changes the target charging voltage (engine load) based on the operation state of the engine 11 (normal running state, acceleration running state, deceleration running state, and state of use of various electronic parts). Here, ECU 37, when the engine 11 is in the idling operation state and the predetermined purge execution condition is met, sets the target charging voltage (power generation amount) of the alternator 31 based on the vapor concentration detected by the vapor concentration sensor 42. Here, the target charging voltage of the alternator 31 is controlled so that the target charging voltage is higher (in other words, so that the power generation amount is higher) when the vapor concentration is high compared with when the vapor concentration is low. Further, the battery 32 is provided with a charge amount sensor (charge state detector) 43 to detect the charge amount (battery charge state), and the ECU 37 changes the target charging voltage based on the charge amount of the battery detected by the charge amount sensor 43. Here, the target charging voltage of the alternator 31 is controlled so that the target charging voltage is higher (in other words, the power generation amount is higher) when the battery charge amount is low compared with when the battery charge amount is high. The change in the target charging voltage of the alternator 31 in accordance with the vapor concentration and the battery charge amount may be controlled so that the change is continuous or step-wise.

The control is performed so that when the engine 11 is in the idling operation state and the vapor concentration of the vaporized fuel increases, the target charging voltage of the alternator 31 increases. Then, the power generation friction of the alternator 31 increases to lower the number of rotations of the engine. The ECU 37 controls the electronic throttle valve 23 and the ISC valve 52 based on the throttle opening $\theta_s$ and the idling signal, and performs a feedback control so that the number of rotations of engine Ne attains a target number. Since the intake air amount in the idling state is increased through the control of the ISC valve 52 when the power generation friction of the alternator 31 becomes high to drop the number of rotations of engine, the number of rotations of engine Ne can be maintained at the target number. Thus, the increase in the intake air amount also causes the increase in the fuel injection amount, whereby the margin of the fuel injection amount with respect to the minimum fuel injection amount can be widened.

Next, the charging control and the purge control by the control apparatus for the internal combustion engine of the embodiment will be described based on the flowcharts of FIGS. 2 and 3, respectively.

In the charging control of the alternator 31, as shown in FIG. 2, the ECU 37 reads out the vapor concentration of the vaporized fuel detected by the vapor concentration sensor 42 and also reads out the battery charge amount detected by the charge amount sensor 43 at step S11. Then at steps S12, S14, and S16, the ECU 37 determines the operation state of the engine 11 based on the number of rotations of engine Ne, the intake air amount $Q_A$, the throttle opening $\theta_s$, the accelerator opening $\theta_A$, the engine cooling water temperature K, and the vehicle speed, to set the target charging voltage of the alternator 31 based on the result of determination.

Specifically, at step S12, the ECU 37 determines whether the engine 11 is in the normal running state, and if the engine 11 is in the normal running state, the ECU 37 proceeds to step S13 in which the target charging voltage of the alternator 31 in the normal running state is calculated. Contrary, if the engine 11 is not in the normal running state at step S12, the ECU 27 proceeds to step S14 in which the ECU 37 determines whether the engine 11 is in the deceleration running state or not, and if the engine 11 is in the deceleration running state, the ECU 37 moves to step S15 in which the target charging voltage of the alternator 31 in the deceleration running state is calculated. If the engine 11 is not in the deceleration running state at step S14, the ECU 37 proceeds to step S16 in which the ECU 37 determines whether the engine 11 is in the idling state or not, and if the engine is not in the idling state, the ECU 37 moves to step S17 in which the target charging voltage of the alternator 31 in the acceleration running state is calculated.

When the engine 11 is determined to be in the idling state at step S16, the ECU 37 proceeds to step S18 in which the target charging voltage of the alternator 31 in the idling state is calculated. The ECU 37 has a map (graph) shown in FIG. 4, and one of charge states "low", "medium", "high" in the graph is selected according to the battery charge amount detected by the charge amount sensor 43. Then, the target charging voltage of the alternator 31 is set according to the selected charge state of the graph corresponding to the vapor concentration detected by the vapor concentration sensor 42.

Once the target charging voltage of the alternator 31 is set in accordance with the operation state of the engine 11 at steps S13, S15, S17, and S18, the target charging voltage is converted into the target charging value at step S19 and the target charging value is output to the alternator 31 at step S20 for control.

On the other hand, in the purge control of the vaporized fuel, as shown in FIG. 3, the determination of the purge execution condition of the vaporized fuel is performed at step S21 and if the purge execution condition is met at step S22, the ECU 37 permits the purge execution and moves to step S23. At step S23, the ECU 37 calculates the vapor concentration based on the value detected by the vapor concentration sensor 42, calculates the purge ratio at step S24, performs a guard treatment, in other words, checks whether the calculated purge ratio is in a predetermined range or not, and when the calculated purge ratio is not in the range, sets an upper limit or a lower limit. Then, at step S26, the ECU 37 sets the duty ratio of the driving pulse of the purge control valve 35 according to the calculated purge ratio and outputs the same. Then, the vaporized fuel collected in the canister 34 is sucked into the intake tube 21 via the purge path 36 by an amount corresponding to the opening (duty ratio) of the purge control valve 35 and purged. When the purge execution condition is not met and the purge is not permitted at step S22, the ECU 37 moves to step S27 in which the ECU 37 sets the duty ratio to zero and ends the process, in other words, the ECU 37 does not perform the purge treatment.

With the charging control of the alternator 31, the target charging voltage is changed according to the operation state of the engine 11 and with the purge treatment of the vaporized fuel, the fuel injection amount is corrected according to the vapor concentration of the vaporized fuel. Hence, when the purge treatment of the vaporized fuel is performed in the idling state of the engine 11, the fluctuation in the power generation friction of the alternator 31 tends to negatively affect the rotation of the engine 11 to cause the fluctuation in rotation.

In the embodiment, however, the ECU 37 sets the target charging voltage of the alternator 31 based on the vapor concentration of the vaporized fuel at the time of the idling operation state of the engine 11, in other words, sets a fixed value of the target charging voltage. Hence, the fluctuation in the power generation friction is suppressed through the decrease in the fluctuation of power generation amount of the alternator 31 and the fluctuation in rotation of the engine 11 can also be reduced.

Thus, with the reduction in the fluctuation of rotation of the engine 11 in the idling operation state, the fluctuations in the air intake amount and the fuel injection amount are eliminated, and the vaporized fuel collected in the canister 34 can be purged by a predetermined amount to the intake path 27 with a constant purge ratio of the vaporized fuel, whereby a stable purge treatment of the vaporized fuel is allowed. The ECU 37 sets a higher target charging voltage of the alternator 31 corresponding to the increase in the vapor concentration of vaporized fuel in the idling operation state of the engine 11, and the ISC valve increases the air intake amount up to a balanced amount with the power generation friction, the margin of the fuel injection amount with respect to the minimum fuel injection amount is widened and the purge treatment amount can be increased, whereby a secure purging of the collected vaporized fuel is guaranteed.

In addition, since the ECU 37 changes the target charging voltage of the alternator 31 based on the charge amount of the battery 32 (battery charge state), setting a higher target charging voltage when the charge amount of the battery 32 is low, a secure purging of the vaporized fuel can be achieved without the increase in the load on the battery 32.

Thus in the control apparatus for the internal combustion engine of the embodiment, when the purge execution condition for the vaporized fuel collected in the canister 24 is met in the idling operation state of the engine 11, the power generation amount (target charging voltage) of the alternator 31 is set based on the vapor concentration of the vaporized fuel.

Hence, through the suppression of the fluctuation of power generation friction caused by the decrease in the fluctuation of power generation amount by the alternator 31, the fluctuation in rotation of the engine 11 can be reduced. Further, with the elimination of the fluctuations in the air intake amount and the fuel injection amount of the engine 11, the vaporized fuel collected in the canister 34 can be purged by an appropriate amount, to allow a secure purging of the vaporized fuel. As a result, the drivability of the engine 11 is improved.

As can be seen from the foregoing, the control apparatus for the internal combustion engine according to the present invention sets the power generation amount of the electric generator based on the vapor concentration of the vaporized fuel in purging the vaporized fuel in the idling operation state of the internal combustion engine, and is useful for the internal combustion engine provided with the electric generator and the canister.

What is claimed is:

1. A control apparatus for an internal combustion engine comprising:

an electric generator which is driven by the internal combustion engine;

a battery which charges electricity generated by the electric generator;

a canister which absorbs vaporized fuel from a fuel tank;

a vapor concentration detecting unit which detects a vapor concentration of the vaporized fuel; and a vaporized fuel purging unit that purges the vaporized fuel absorbed by the canister into an intake path of the internal combustion engine when a predetermined purge execution condition is met, wherein an amount of electricity generated by the electric generator is controlled to become higher when the vapor concentration detected by the vapor concentration detecting unit is high compared with when the vapor concentration is low when the internal combustion engine is in an idling operation state and the purge execution condition is met.

2. The control apparatus for the internal combustion engine according to claim 1, wherein the amount of electricity generated by the electric generator is controlled so that the amount of electricity generated by the electric generator increases along with an increase in the vapor concentration detected by the vapor concentration detecting unit.

3. The control apparatus for the internal combustion engine according to claim 1, further comprising a charge state detecting unit that detects a charge state of the battery, and the amount of electricity generated by the electric generator is controlled so that the amount of electricity generated by the electric generator is increased when a charge amount of the battery detected by the charge state detecting unit is low compared with when the charge amount is high.

* * * * *